Aug. 7, 1951  J. R. WOODYARD  2,562,977
COARSE AND FINE RADAR DISTANCE MEASURING SYSTEM
Filed April 27, 1944  2 Sheets—Sheet 1
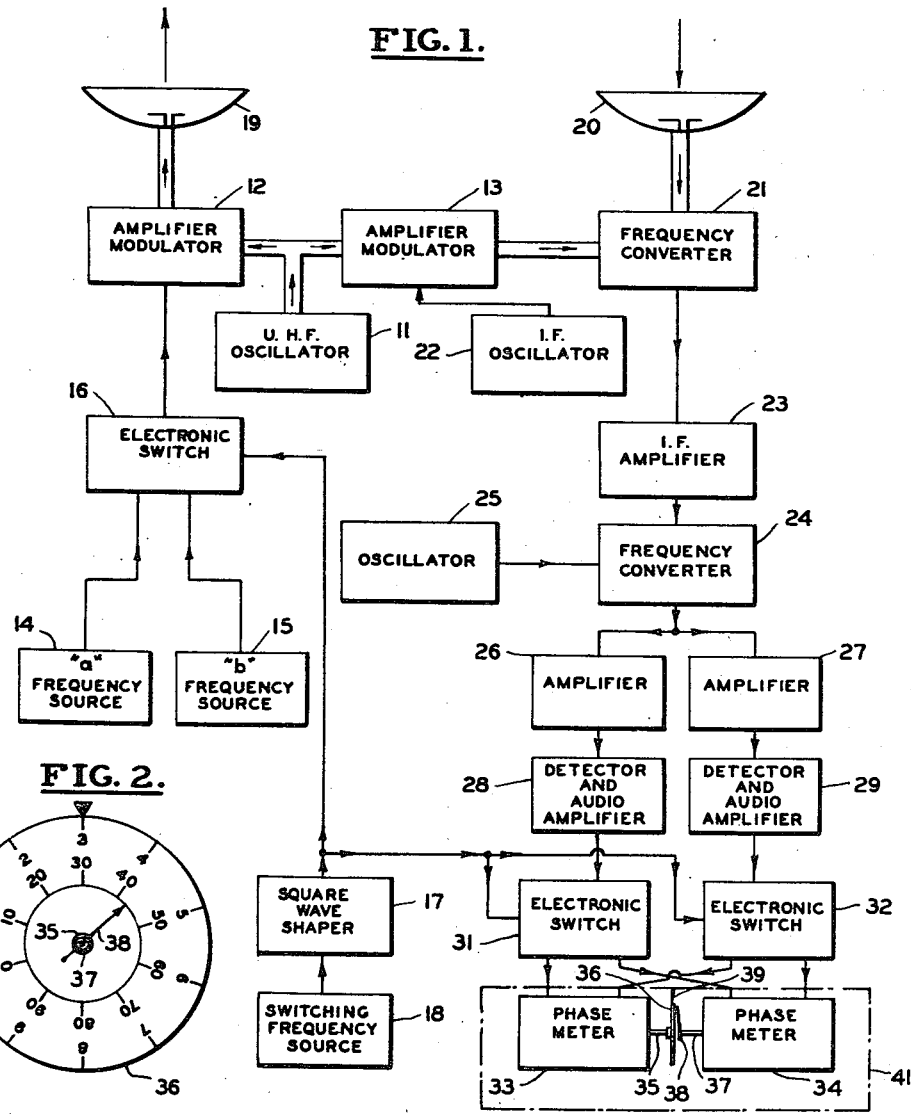
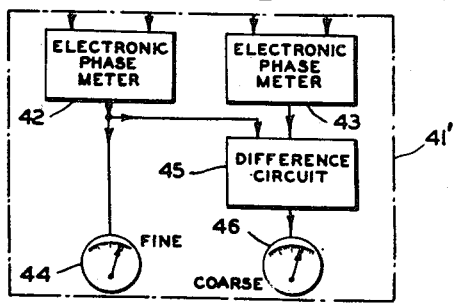
INVENTOR
J. R. WOODYARD
BY
Paul B. Hunter
ATTORNEY

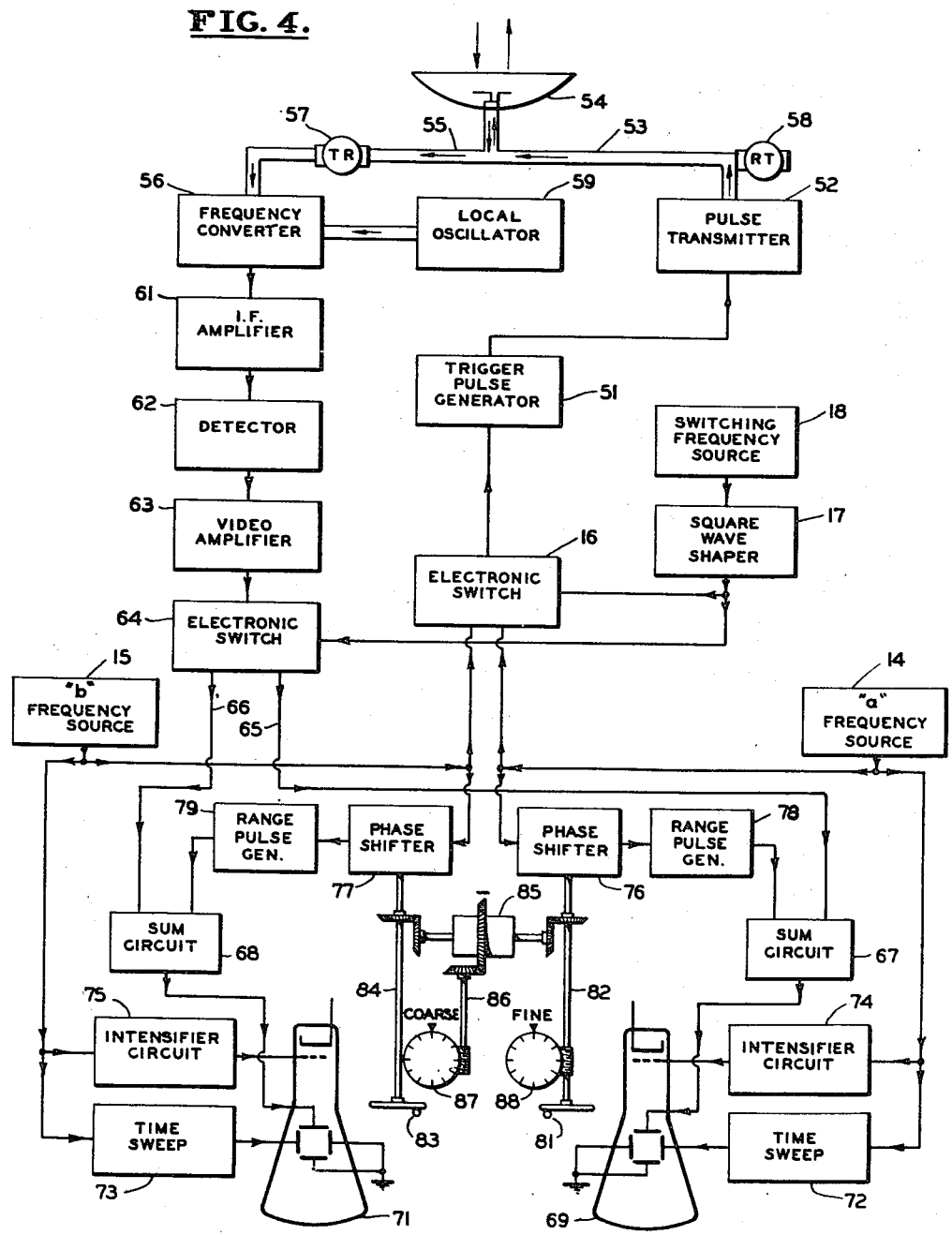

Patented Aug. 7, 1951

2,562,977

UNITED STATES PATENT OFFICE 2,562,977

COARSE AND FINE RADAR DISTANCE MEASURING SYSTEM

John Robert Woodyard, Garden City, N. Y., assignor to The Sperry Corporation, a corporation of Delaware Application April 27, 1944, Serial No. 533,070

11 Claims. (Cl. 343—13)

The present invention relates generally to measuring apparatus, and, more particularly, to a method and means for determining the magnitude of an unknown quantity from the indications of a plurality of repetitive measuring systems whose full scale indications are less than the magnitude of the quantity measured.

An object of the invention is to provide a differential measuring system for extending the effective range of two or more short-range measuring devices which have suitably chosen unequal maximum measuring capacities, by reading the difference between the fractional indications of the devices on an appropriately marked long-range scale.

Another object is the provision of means for measuring the range of an object detected by a radio locator system in terms of the difference between the indications of two time interval measuring systems whose indications correspond to the excess of the transit time of radiant energy passing to and from the object over integral multiples of maximum measuring capacities of the individual measuring systems.

Yet another object is to increase the maximum unambiguous range indication of a continuous wave radio locator system and to improve the accuracy of range measurement by furnishing multiple range scales which do not create design complexities resulting from overlapping or closely spaced frequencies.

A still further object of the present invention lies in the provision of a pulse type of radio locator wherein distances to objects may be unambiguously measured even when the objects lie at ranges corresponding to propagation times exceeding the repetition period of the radiated pulses.

Other objects and advantages will become apparent from the specification taken in connection with the accompanying drawings wherein the invention is embodied in concrete form.

In the drawings,

Fig. 1 is a block diagram of a continuous wave type of radio locator system embodying the present invention;

Fig. 2 is an illustration of typical indicating scales provided by the present invention;

Fig. 3 is a block diagram of an alternative indicating system which may be employed in the structure of Fig. 1; and Fig. 4 is a block diagram of a pulse type radio locator system embodying the present invention.

Similar reference characters are used in the above figures to indicate corresponding parts. Arrows are employed in Figs. 1, 3 and 4 to indicate the direction of energy flow.

The theoretical basis underlying the present invention may be best explained by a brief and simplified mathematical analysis.

Let $z$ be an independent variable quantity, such as distance, whose magnitude it is desired to measure by means of two repetitive systems, such as phase meters, the first system having a maximum unambiguous indication of $a$, and the second system having a maximum unambiguous indication of $b$. The two systems are related by the following equations:

$$z = am + ax \quad (1)$$

$$z = bn + by \quad (2)$$

where $x$ and $y$ are the fractional parts of $a$ and $b$, respectively, which parts are indicated by the two systems while $m$ and $n$ are integral multiples of $a$ and $b$, respectively, which multiples are unknown because of the repetitive character of the systems.

Equations 1 and 2 may be rewritten as $$x = -m + \frac{z}{a} \quad (3)$$

and $$y = -n + \frac{z}{b} \quad (4)$$

We may eliminate $m$ and $n$ by making $m=n$ and subtracting Equation 4 from Equation 3. We then have $$x - y = z\frac{(b-a)}{ab} \quad (5)$$

or $$z = (x-y)c \quad (6)$$

where $$c = \frac{ab}{b-a}$$

and therefore $$b = \frac{ca}{c-a}$$

It is observed that $z$ has an unambiguous maximum equal to $c$ when $x=1$ and $y=0$.

It is seen that a pointer that rotates according to the difference between the indications of the two systems may be employed according to Equation 6 with a scale calibrated in integral multiples of $a$ up to a maximum no greater than $c$ to indicate the approximate magnitude of $z$. The differential scale, therefore, determines the quantity $am$ while the first repetitive system indicates the quantity of $ax$, thus completing Equation 1.

The constant $c$ may be any desired number; consequently the maximum unambiguous value of $z$ may be anything convenient or usable. In practice it is often desirable to employ a decimal system so that the differential or coarse scale and the fine scale may be read without the necessity for any mental addition. For example, if $a$ is equal to 10 and $c$ equal to $+$ or $-100$, the differential scale may be calibrated in tens up to 100 and the fine scale will read in units up to 10. When $a$ is 10 then $b$ can be either approximately 11.11 or 9.09 to provide a differential scale reading to a maximum of 100. This method of extending the capacity of measuring apparatus finds important application in radio locator systems of the type shown in copending U. S. Patent No. 2,435,615, entitled Object Detecting and Locating System and filed September 30, 1941, and issued February 10, 1948, in the names of R. H. Varian et al.

It is well known that when a reflecting object has a component of velocity relative to a radio transmitter, that portion of the intercepted radiant energy which is returned toward the radiation source differs in frequency from the transmitted energy because of the Doppler phenomenon. This difference in frequency may be called the Doppler frequency and is expressed with good accuracy by the equation $$f_d = \frac{2Vf_1}{C} \quad (7)$$

where $f_d$ is the Doppler frequency, $V$ is the radical component of velocity of the object relative to the source of radiation, $f_1$ is the transmitted frequency, and $C$ is the velocity of electromagnetic radiation. The transmitted and reflected waves may be mixed in a detector to produce a beat note of the Doppler frequency revealing the presence of the moving object, and this frequency may be readily measured to provide an accurate knowledge of the radial velocity of the object. Radio systems responsive to the Doppler beat note are known which provides means for measuring the distance to objects based upon the following considerations.

If an object should start from the source of radiation and move away, each time the object progressed one-half a transmitted wavelength, the Doppler beat frequency in the detector would pass through one cycle. Suppose there were transmitted two slightly different frequencies whose reflections were independently received. Then the audio beat notes in the separate detectors would differ in frequency in the same ratio as the high frequencies from which they were derived. In radio systems of the type discussed, the transmitted frequencies differ so little that the frequency difference between their Doppler beat notes amounts to only a fractional cycle for each beat. This is equivalent to a slowly changing phase shift taking place between the two beat notes as the object recedes, and this phase difference is a measure of the distance to the reflecting object.

The instantaneous phase difference between these beat notes may be shown to be $$\phi = d\frac{2(f_1 - f_2)}{C} \quad (8)$$

where $\phi$ is the phase angle difference in cycles or revolutions, $d$ is the distance to the reflecting object, and $f_2$ is the second frequency radiated by the transmitter. When $$d\frac{2(f_1 - f_2)}{C}$$

is greater than unity, the distance reading as derived by a phase meter becomes ambiguous because the indication is indeterminate by a whole number of cycles. For example, if the two frequencies $f_1$ and $f_2$ differ by 20,000 cycles per second, this affords only 4.65 miles unambiguous range.

Heretofore, an attempt has been made to increase the maximum unambiguous range by reducing the frequency difference between radiated waves. However, two practical difficulties are encountered if this process is carried too far. First, the selectivity required to separate the frequencies becomes increasingly difficult to obtain. Second, if the frequency difference overlaps the range of possible Doppler frequencies, design complications arise. As a result, the maximum practical unambiguous range is about 10 miles with the wavelengths commonly employed.

There is another reason for not having a long range on a single scale. There will be random fluctuations in the reading of the range indicator because of noise voltages. These fluctuations will be a certain percentage of full scale regardless of what number of miles full scale reading represents. Therefore it is desirable to have two or more scales, one long range or coarse scale for reading the approximate range and one short range or fine scale for getting the exact range. This greatly increases the accuracy of range measurement. For example, by having two scales of miles, one reading in units up to ten and the other in tens up to one hundred, the accuracy is increased by a factor of ten over what would be obtained with a single scale reading up to one hundred miles. In the proposed system the long-range scale is obtained by combining the indications of two short-range phase meters according to the principles disclosed by the above mathematical analysis thus avoiding the difficulties experienced in the prior art.

Referring now to Fig. 1, there is illustrated a continuous wave object locating radio system operating in the general manner discussed above. An ultra high frequency oscillator 11 provides a carrrier wave to amplifier-modulators 12 and 13. Modulator 12 is alternately and periodically supplied with modulating signals from audio frequency sources 14 and 15 through the coupling of an electronic switch 16 which is actuated at a sub-audible switching rate by a square wave shaper 17 which is in turn provided with a switching frequency from a source 18. The signals from sources 14 and 15 are adapted to both frequency and phase modulate the ultra high frequency wave introduced to the modulator 12 to produce a carrier and one side band. The two ultra high frequencies thus created have a frequency difference equal to the frequency of either source 14 or source 15, whichever is momentarily being connected to the modulator 12.

Alternate pairs of ultra high frequency waves are transmitted from a radiator 19 connected to the output circuit of the modulator 12. A portion of the radiated energy leaks by direct transmission to a wave collector 20 while greatly attenuated waves are returned to the collector 20 after transmission to an object in the path of radiation. The leakage and reflected signals received over direct and indirect transmission paths, respectively, are fed to a frequency converter 21 to which is also supplied a heterodyning wave from the amplifier modulator 13. Device 13 modulates the output of the oscillator 11 with a suitable intermediate frequency obtained from an oscillator 22. A component of the output wave from modulator 13 always differs from the radiated carrier wave by the intermediate frequency irrespective of any instability of the ultra high frequency oscillator 11. This heterodyning wave is mixed with the received signals to translate them to the intermediate frequency band of an amplifier 23. This amplifier has a band sufficiently broad to amplify the leakage and reflected components derived from all three ultra high frequency waves.

In order to separate the carrier wave from whichever side band frequency is momentarily present, the output of amplifier 23 is connnected to a frequency converter 24 which is supplied a second heterodyne wave from an oscillator 25. The received waves are further reduced in frequency by this process to a low radio frequency range. A selective amplifier 26 connected to converter 24 amplifies only signals originated by the carrier wave while a similar amplifier 27 connected to converter 24 acts only on signals originated by the sidebands. These latter frequencies are very close but need no filtering because they do not exist simultaneously.

After separation in devices 26 and 27, the waves are individually demodulated in detector amplifiers 28 and 29 in which process any frequency difference between the leakage and reflected waves due to relative motion between the object and the locator system results in Doppler beat notes. The Doppler beat notes after amplification in devices 28 and 29 are supplied to electronic switches 31 and 32, respectively. These switches are actuated in synchronism with switch 16 and serve to provide the beat notes alternately to either a phase meter 33 or a phase meter 34. Meter 33 is actuated by the outputs of switches 31 and 32 during the period in which the source 14 is modulating the ultra high frequency transmitter 12 while meter 34 is operative during the interval in which the source 15 is determining the frequency difference between the two radiated waves.

The phase meters 33 and 34 may be similar to the well-known Weston phase meter having a movable element comprising relatively fixed crossed coils supplied with the Doppler beat note from, say, electronic switch 31 through sliprings to permit continuous rotation of the movable element within a field winding energized by the Doppler beat note from, say, electronic switch 32. Alternatively the phase meters 33 and 34 may be of the type described in copending U. S. Patent No. 2,411,876, entitled Phase Angle Indicator and filed September 6, 1943, and issued December 3, 1946, in the name of William W. Hansen. A shaft 35 belonging to the meter 33 supports a dial 36 while a shaft 37 rotated by the phase meter 34 carries a pointer arm 38. The pointer 38 indicates against a moving scale marked upon the dial 36, while an outer scale also engraved upon the dial 36 is read against a stationary index 39.

Fig. 2 illustrates a typical arrangement of scales. Here the shaft 35 is indicated as a hollow tube supporting the dial 36 on which are marked an inner coarse scale and an outer fine scale. The shaft 37 is conveniently positioned concentric with the shaft 35. In this particular instance, dial 36 and pointer 38 are arranged to rotate counter-clockwise for increasing phase delays or distances. The indication is readily seen to be 43 miles. In a practical application of the system of Fig. 1, a carrier wavelength of ten centimeters might be employed for locating aircraft yielding Doppler beat notes as high as 4,000 cycles per second. The frequency of source 14 would be 9,300 cycles a second and the frequency of source 15 would be 8,370 cycles a second, in order to provide decimal scales reading to a hundred mile maximum range without overlapping the band of Doppler beat frequencies. If the frequency of source 15 was chosen as 10,323 cycles a second, then the inner scale of tens would be calibrated in the opposite direction.

Phase measurements in radio locator applications are preferably made with devices like meters 33 and 34 containing only component parts whose behavior may be represented by continuous functions, since information obtained over the entire cycle is utilized, thus tending to cancel out statistically the effects of noise impulses. However, the invention may be carried out with meters which measure the time interval between zero points of the applied Doppler beat notes. The reading given by this latter type of meter depends only on what happens at a particular instant of time, namely the zero crossing time of the cycle, and a small noise voltage is capable of causing a substantial change in the position of these zero points. The structure of Fig. 1 enclosed by the dash line 41 may be replaced by the apparatus contained within the block 41' illustrated in Fig. 3.

Referring now to Fig. 3, phase meters 42 and 43 are adapted to measure the time interval between the zero points of the applied Doppler beat notes and provide voltages substantially proportional to these time intervals. The output voltage of meter 42 may be indicated by a conventional voltmeter 44 to provide a fine distance scale. The difference between the voltage outputs of meters 42 and 43 is derived by a difference circuit 45 whose output is fed to a voltmeter 46 calibrated with a coarse distance scale.

Referring now to Fig. 4, there is illustrated a simple pulse type of radio locator providing a distance measurment of the hereindisclosed differential character. Audio frequency sources 14 and 15 are arranged as in structure of Fig. 1 to initiate the distance-determining frequencies. These audio frequencies are applied to the electronic switch 16, which is actuated at a sub-audible switching rate by the square wave shaper 17 to which is applied the switching frequency from source 18. The signals from sources 14 and 15 are alternately converted by a trigger pulse generator 51 into sharp pulses having a repetition rate determined by the original audio frequency waves. The trigger pulses are supplied to a pulse transmitter 52 for momentarily energizing an ultra high frequency oscillator such as a magnetron. The transmitter 52 produces extremely short pulses of high power and perhaps a microsecond duration, which are fed through a wave guide 53 to a radiator 54. The radiator 54 also serves to receive energy returned from objects during the intervals between successive pulse transmissions. The received energy passes through a wave guide 55 to a frequency converter 56.

Automatic switches 57 and 58 known to the art as TR and RT boxes, respectively, cooperate with the wave guides 55 and 53, respectively, to disassociate the pulse transmitter 52 from the frequency converted 56 and associated receiver circuits. The RT box 58 and the TR box 57 are placed in parallel and series, respectively, in guides 53 and 55, respectively. These switches are of the gaseous discharge type consisting of a gas-filled resonant chamber containing electrodes held at such relative potentials as to maintain the gas close to the ionization point. These chambers are adapted to discharge when strongly excited and thus effectively dampen the exciting oscillations. The boxes are positioned so that in the quiescent condition the impedance of guide 55 is low, while the impedance of guide 53 is high, but in the ionized state these conditions are reversed. Therefore, transmitted pulses upon attempting to pass through the TR box 57 discharge the resonant chamber and create substantially a short circuit therein which effectively blocks passage of high amplitude pulses to the conveyor 56. The relatively low intensity received pulses fail to ionize either of the switches 57 or 58 and, therefore, encounter a low impedance path toward the receiver and a high impedance path toward the transmitter, a condition which prevents loss of received energy in the latter.

A local oscillator 59 supplies a heterodyning wave to the converter 56 for the purpose of translating the pulsed ultra high frequency waves to an intermediate frequency where the received signals are amplified by a broad band I. F. amplifier 61. The amplified pulses from device 61 are detected in a detector 62 and amplified by a video amplifier 63. The video pulses are impressed upon an electronic switch 64 which is actuated in synchronism with the switch 16. The video pulses having a repetition rate equal to the frequency of source 14 are applied over a lead 65 to a sum circuit 67, while video pulses having a periodicity the same as surce 15 are fed over a lead 66 to a sum circuit 68.

The outputs of sum circuits 67 and 68 are applied to the vertical deflection electrodes of cathode ray tubes 69 and 71, respectively. The horizontal deflection electrodes of indicators 69 and 71 are energized by linear sweep circuits 72 and 73, respectively, which are synchronized by frequency sources 14 and 15, respectively. These sweep circuits provide sawtooth deflection voltages which commence substantially simultaneously with the radiation of the ultra high frequency pulses from the radiator 54. Intensifier circuits 74 and 75 synchronized in a similar manner as sweep circuits 72 and 73 and are adapted to turn on the electron beams in their associated cathode ray tubes during the forward deflection of the beams. It is evident that the resultant patterns on the oscillograph screens represent the amplitude of the received signals as a function of time interval.

Range reference pulses are provided to permit accurate measurement of distance in terms of time interval, and a differential scale is employed to eliminate ambiguity due to the repetitive character of the time sweeps. Linear phase shifters 76 and 77 are supplied with waves from sources 14 and 15, respectively, and their phase-shifted output waves are applied to range pulse generators 78 and 79, respectively. The range pulse generators 78 and 79 convert the phase-shifted sinusoidal waves into sharp pulses which are added to the received pulses in the sum circuits 67 and 68, respectively. Therefore, the fractional phase shift or time interval between transmitter and received pulses may be determined by superimposing the range pulses on the received pulses by manipulation of the phase shifters.

A control knob 81 attached to a shaft 82 is adapted to actuate the phase shifter 76 while a control handle 83 attached to a shaft 84 is arranged to actuate the phase shifter 77. A mechanical differential 85 interconnects shafts 82 and 84 and rotates an output shaft 86 according to the difference between the input rotations. A coarse distance scale 87 is actuated by the shaft 86 while a fine distance scale 88 is driven by the shaft 82. In practice, control knob 83 is adjusted to cause the range pulse to be superimposed upon the desired received pulse indicated upon the screen of the oscillograph 71, while the handle 81 is rotated to cause the range pulse appearing on the tube 69 to be aligned with the received pulse corresponding to the same object as is measured on the tube 71. Under these conditions, the coarse scale 87 and the fine scale 88 provide an unambiguous distance determination despite the fact that the propagation time of pulses to and from the reflecting object may greatly exceed the pulse repetition period.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A coarse and fine radio system for object location comprising means for radiating a plurality of different frequency radio signals, means for receiving said signals after reflection from an object, dual means for measuring the phase displacements between radiation and reception of said signals for providing a fine indication of distance, and means to extend the unambiguous range and to resolve cyclic ambiguity of said fine indication comprising differential indicator apparatus means responsive to the difference between the phase measurements of said dual means for indicating the coarse distance of said object from said radio system.

2. An object detecting and locating system comprising means for generating and radiating three radio frequency waves, means for receiving said waves after reflection from an object having motion relative to said system, mixer means for comparing respective frequencies related to said radiated and reflected waves to obtain three beat note waves occasioned by said relative motion, dual means for measuring the phase of one of said beat note waves relative to the phases of said other two beat note waves, and differential means for obtaining the difference between the measurements of said dual means to determine the distance of said object.

3. An object detecting and locating system comprising means for generating a plurality of radio frequency waves, means for radiating said waves into space, means for receiving said waves after reflection from an object having motion relative to said system, mixer means for comparing waves related to said radiated and reflected waves to obtain a plurality of beat notes corresponding to the differences in frequency between each radiated wave and its respective reflected wave, plural phase responsive means supplied by said mixer means for determining the phase of one of said beat notes relative to the phases of each of the other of said beat notes, and differential means for obtaining the difference between two of said phase determinations as a measure of the distance to said object.

4. An object detecting and locating system comprising means for generating three radio frequency waves, the frequency differences between the first of said waves and the second and third of said waves being inversely proportional to constants $a$ and $$\frac{ca}{c-a}$$

respectively, where $c$ is a constant, means for radiating said waves into space, means for receiving said waves after reflection from an object having motion relative to said system, mixer means for comparing waves related to said radiated and reflected waves to obtain three beat notes corresponding to the differences between each radiated wave and its respective reflected wave, a first phase responsive means supplied from said mixer means for determining the phase relationship between beat notes derived from said first and second waves, a second phase responsive means supplied from said mixer means for determining the phase relationship between beat notes derived from said first and third waves, and differential means for obtaining the difference between the determinations of said first and second phase responsive means, the distance to said object being measured in accordance with the product of said constant $c$ and said difference.

5. A radio system for object location comprising means for radiating radio waves in pulses at two repetition rates, the periodicity of said pulses being proportional to a constant $a$ and to a constant $$\frac{ca}{c-a}$$

respectively where $c$ is a constant, means for receiving said pulses after reflection from an object, a first timing means for measuring the fractional period in excess of an integral multiple of $a$ between radiation and reception of pulses having a periodicity proportional to $a$, a second timing means for measuring the fractional period in excess of an integral multiple of $$\frac{ca}{c-a}$$

between radiation and reception of pulses having a periodicity proportional to $$\frac{ca}{c-a}$$

and differential means responsive to the difference between the measurements of said timing means for indicating the distance to said object in accordance with the product of said difference and said constant $c$.

6. In a system for determining the magnitude of an independent variable quantity the combination of dual measuring means for measuring said variable quantity, said measuring means being of the repetitive type in which the indication is proportional to the excess of said variable quantity over an integral multiple of the maximum indication of said measuring means, the maximum indication of one of said measuring means being equal to a constant $a$ and the maximum indication of the other of said measuring means being equal to a constant $$\frac{ca}{c-a}$$

and differential means for indicating the magnitude of said variable quantity as the product of $c$ and the difference between the fractional indications of said measuring means.

7. A radio system for object location comprising means for radiating two distinctive radio signals, means for receiving said signals after transit over a common path to and from an object, a first measuring means for measuring the distance to said object in terms of the transit time between radiation and reception of the first of said signals, a second measuring means for measuring the distance to said object in terms of the transit time between radiation and reception of the second of said signals, and differential means responsive to the difference between the measurements of said first and second measuring means for indicating the distance to said object.

8. A radio system for determining the distance to a reflecting object comprising means for radiating two distinctive radio signals, means for receiving said signals after reflection from said object, a first timing means responsive to the times delay incurred by the first of said signals in travelling to and from said object, a second timing means responsive to the time delay incurred by the second of said signals in travelling to and from said object, and means actuated by the difference between the responses of said first and second timing means for determining the distance to said object.

9. In a radio system, means for receiving a plurality of radio waves, means for mixing said waves to obtain at least three separate frequency waves, first and second phasemeters for measuring the phase of one of said waves relative to the phases of two other of said waves, and means for indicating the difference between the measurements of said phasemeters to extend their individual unambiguous phase measuring capacities.

10. In apparatus for measuring the difference in the apparent lengths of two transmission paths, means for receiving a plurality of waves including first and second waves over one path and third and fourth waves over the other path, said first and third waves differing by a low frequency substantially equal to the frequency difference between said second and fourth waves; means for beating said first and third waves together and second and fourth waves together to obtain signals at said low frequency; means for deriving a phase reference signal from waves received over at least one of said paths; first and second phasemeters for measuring the phase of said beat frequency signals relative to said phase reference signal; and means for indicating the difference in said path lengths in proportion to the difference between the measurements of said phasemeters.

11. A coarse and fine radio distance measuring system for object location comprising means for radiating radio waves in pulses at two repetition rates, means for receiving said pulses after reflection from an object, a first fine indication timing means for measuring the phase intervals between radiation and reception of pulses having one repetition rate, a second fine timing means for measuring the phase intervals between radiation and reception of pulses having the other repetition rate, means to extend the unambiguous range of fine measurement comprising means to resolve cyclic ambiguity of said fine indication including a differential computer responsive to the differences between the measurements of said first and second fine timing means for computing the coarse distance to said object in terms of a wavelength longer than the wavelengths of said two pulse repetition rates, and means responsive to said computer to indicate said coarse distance on a coarse distance scale.

JOHN ROBERT WOODYARD.

REFERENCES CITED

The following references are of record in the file of this patent:

UNITED STATES PATENTS

| Number | Name | Date |
|---|---|---|
| 1,750,668 | Green | Mar. 18, 1930 |
| 2,046,890 | Young | July 7, 1936 |
| 2,118,518 | Neumann | May 24, 1938 |
| 2,151,323 | Hollmann | Mar. 21, 1939 |
| 2,176,469 | Moueix | Oct. 17, 1939 |
| 2,225,046 | Hunter | Dec. 17, 1940 |
| 2,268,587 | Guanella | Jan. 6, 1942 |
| 2,312,203 | Wallace | Feb. 23, 1943 |
| 2,412,003 | Neufeld | Dec. 3, 1946 |
| 2,423,103 | Koechlin | July 1, 1947 |
| 2,435,615 | Varian et al. | Feb. 10, 1948 |
| 2,452,598 | Page | Nov. 2, 1948 |